March 26, 1940.    J. N. WHITEHOUSE    2,194,488
APPARATUS AND METHOD FOR MAKING TUBULAR ARTICLES
Filed Jan. 16, 1935    2 Sheets-Sheet 1
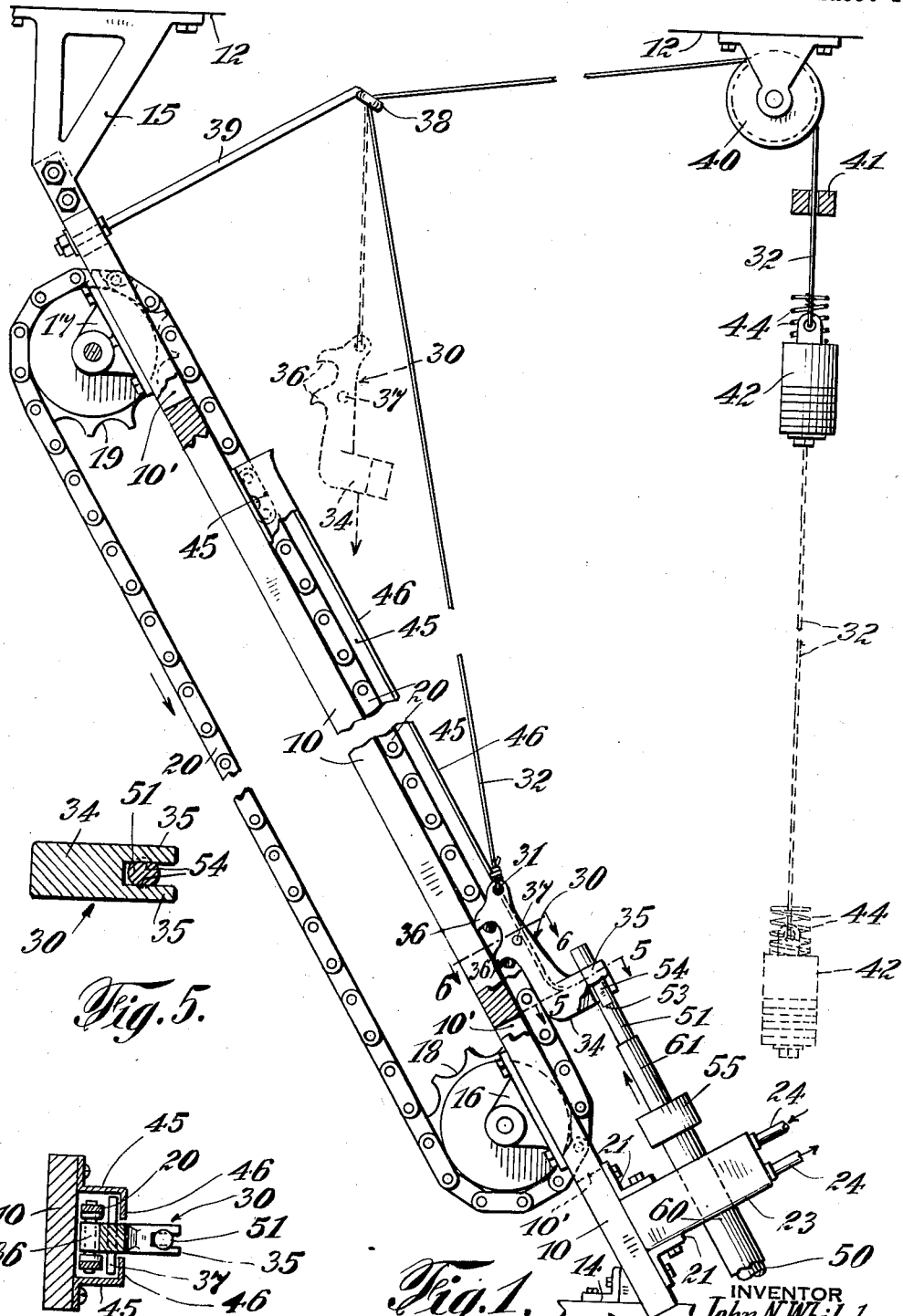

March 26, 1940. J. N. WHITEHOUSE 2,194,488
APPARATUS AND METHOD FOR MAKING TUBULAR ARTICLES
Filed Jan. 16, 1935 2 Sheets-Sheet 2
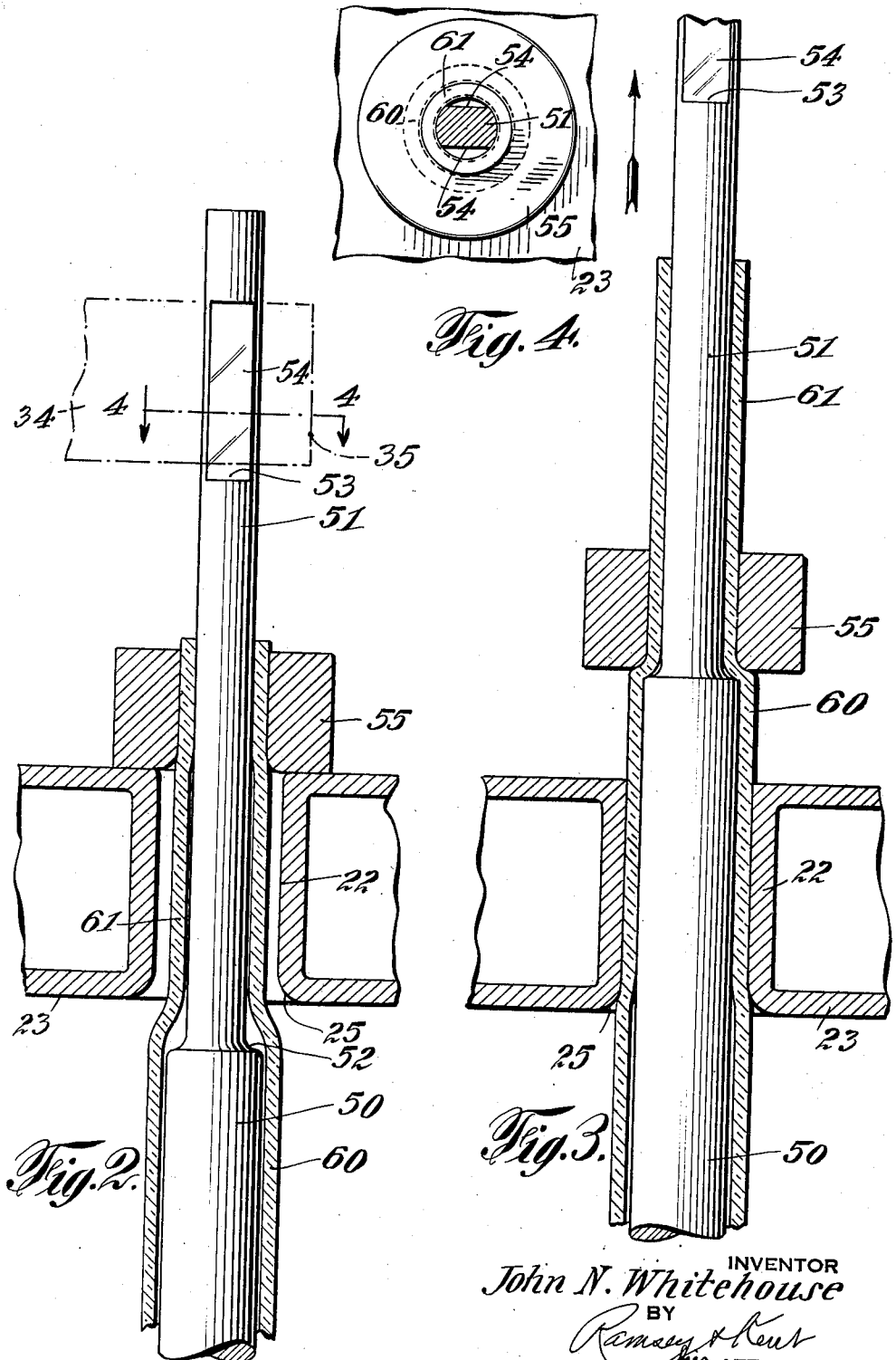
INVENTOR
John N. Whitehouse
BY
Ramsey & Kent
ATTORNEYS Patented Mar. 26, 1940

2,194,488

UNITED STATES PATENT OFFICE 2,194,488

APPARATUS AND METHOD FOR MAKING TUBULAR ARTICLES

John N. Whitehouse, Camden, N. J.

Application January 16, 1935, Serial No. 2,049

9 Claims. (Cl. 18—3)

This invention relates to improvements in tubular Celluloid articles and to means for and methods of producing the same.

The term "Celluloid" is used herein in its general meaning in which it designates plastic cellulose base materials capable of being molded and capable of being united with a solvent. In making such materials, the cellulose is usually either acetated or nitrated, but it may be otherwise treated. The term is also to be construed as defining any material having characteristics which adapt it to be processed in the manner set forth hereinafter.

Celluloid tubes for use in the manufacture of fountain pen barrels, caps, and other similar articles, have been produced in various ways heretofore. One method of producing a tube in use quite extensively is the method of extruding the somewhat spongy mass of material into tubular shape and then permitting the tube to become set. Of course such extruded tubes are somewhat more spongy in character than blocks of Celluloid processed under extremely high pressure. Furthermore, the extruded tubes do not possess the exterior smooth surface necessary for their utilization as fountain pen barrels, caps, etc. Extruded tubes have been smoothed by means of so-called centerless grinding mechanisms of various character but disadvantages result from such manufacturing steps. Even though the grinding apparatus be adjusted as critically as possible the finished tube will almost inevitably be found to have uneven wall thickness at various points. In other words, the inner surface is not concentric with the outer surface.

An object of the present invention is to provide as a new article of manufacture a Celluloid tube of smooth exterior and of a more compressed density than is present in extruded tubes.

Another object of the invention is to provide means for producing a tube of the character set forth hereinbefore.

Another object of the invention is to provide methods for producing such a tube.

A further object of the invention is to provide means for and methods of treating an extruded tube of Celluloid in such fashion that the tube has uniform wall thickness and has a smooth outer surface.

Another object of the invention is to provide mechanism for simultaneously applying heat to an extruded Celluloid tube and for the compressing the tube.

In carrying out the invention, an extruded Celluloid tube has one end portion thereof operated upon to cause it to have a reduced diameter. This operation may be carried out in one of a number of ways, such as for example by swedging. The tube is then slipped over a mandrel which also has an end portion of reduced diameter. The mandrel is passed through a heated die, the smaller end passing through the die first. In order that the tube may be locked on the mandrel a ring is inserted over the small end portion of the tube. Due to the heat imparted to this small end portion by the die as the tube passes through the die, the tube tends to swell thereby engaging the ring and locking the tube onto the mandrel. A hook is engaged with a suitable portion of the mandrel and is mechanically actuated to pull the mandrel with the tube thereon through the die. The die has an internal diameter slightly smaller than the initial external diameter of the tube so that passage of the mandrel and the tube through the die serves to compress the tube and to elongate it while at the same time the contact between the exterior surface of the tube and the heated wall of the die imparts a smoothness to the exterior surface.

The mechanism for drawing the mandrel and tube through the die consists of an endless chain to the links of which may be hooked a hook having a forked portion for engaging the mandrel. This endless chain of course passes over sprocket wheels, one of which is driven in some suitable manner. When the hook reaches the uppermost sprocket wheel, the teeth of this wheel disengage the fingers of the hook from the chain links and at the same time the movement of the hook in such disengagement also disengages the forked portion from the mandrel. The hook is preferably connected to a counter-weight which is slightly lighter than the hook so that when the hook is disengaged from the mandrel it returns to its starting position by gravity. The smoothed tube may be disengaged from the mandrel, the residue due to the small end portion cut off, and the tube will then be in finished condition. This finished tube, due to its passage through the heated die, is more compressed than is the case of ordinary extruded tubes, and it has been found in practice that the wall of the tube will be of uniform thickness in distinction to the uneven wall thickness of tubes smoothed by centerless grinding mechanisms or other mechanisms. Also it has been found that the finished tube is slightly longer than the unfinished tube due to the stretching and compression of the tube as it passes through the heated die.

Other features, objects, and advantages of the invention will become apparent by reference to the following detailed description taken in conjunction with the accompanying drawings, wherein:

Fig. 1 is a side elevation of apparatus embodying the invention;

Fig. 2 is an enlarged vertical section of part of the appartus shown in Fig. 1 in one position;

Fig. 3 is a similar view of the same apparatus in another position;

Fig. 4 is an enlarged plan view of the heating device with the mandrel passing therethrough;

Fig. 5 is a section taken substantially on the line 5—5 of Fig. 1; and

Fig. 6 is a section taken substantially on the line 6—6 of Fig. 1.

Referring now to the drawings, 10 indicates an inclined beam or board mounted between a base 11 and an upper supporting member 12 which may be the ceiling of a room by means of an angle bar 14 at the bottom and a hanger 15 at the top. This beam 10 is of considerable width in relation to other parts of the mechanism as shown in Fig. 6, and it is provided with recesses or slots 10' near the top and the bottom for the passage therethrough of an endless chain 20. Secured to the beam 10 are bearings 16 and 17 in which are journaled sprocket wheels 18 and 19 over which endless chain 20 passes. The upper sprocket wheel 19 is actuated by some suitable source of power, not shown, to drive the chain. The beam 10 as shown is inclined at an angle to the vertical and serves as a support for the upgoing expanse of chain 20, preventing sagging of this expanse of the chain. The purpose of this construction will be explained hereinafter.

Extending at right angles to the beam 10 is a heated die member 23 secured to the beam by means of angle member 21. This die member 23 is provided with an opening which is defined by the wall 22. Preferably, the die 23 is hollowed out to receive the heating medium, such as steam, hot water, or if desired, an electric heating unit may be supplied therefor. The conduits 24 are shown entering the hollowed portion of the die to supply the heating medium, be it hot water, steam or electricity. The lower edge of the wall 22 is rounded as at 25 (Figures 2 and 3.)

In conjunction with the conveyor chain use is made of a hook 30 having an eye 31 at the top for the attachment of a cord 32 and having a foot portion 34 made up of prongs 35. Extending from the hook in the opposite direction to the prongs 35 are a pair of claws 36 spaced apart a distance approximately equal to the distance between two links of the chain 20. A pin 37 extends through the hook on each side thereof for a purpose to be explained later. The cord 32 passes through an eye 38 on the end of a bar 39 secured to the upper end of the beam 10. The cord then passes over an idler pulley 40 supported from the support 12, which as before mentioned may be the ceiling of a room. From the idler 40 the cord passes through a stop 41 mounted in any suitable fashion and then to a counter-weight 42. A spring 44 rests on top of the counter-weight surrounding the cord 32. This counter-weight is slightly lighter than the hook 30 so that when the hook is free from engagement with the chain, or with any other object, its weight will cause it to descend into the initial position of operation. The purpose of the spring 44 is to prevent shocks, since this spring will contact with the stop 41 when the hook descends.

To the top surface of the beam 10 are fastened a pair of Z bars 45 having their top surfaces 46 spaced apart as shown in Fig. 6 a distance sufficient to accommodate the body of the hook 30. These Z bars are spaced apart laterally a distance sufficient to accommodate the chain 20 and they extend outwardly from the beam a distance sufficient to permit the pin 37 to ride under the top portions 46. Thus once the hook has been engaged with the chain and passes upwardly so that the pin 37 fits under the tops 46, the hook can not be disengaged from the chain until the upper ends of these bars are reached.

The mandrel utilized in conjunction with the invention is shown clearly in Figs. 2 and 3, wherein it is illustrated as having a portion of one diameter as indicated at 50 and a portion of smaller diameter as indicated at 51, these portions being joined by a shoulder 52. Near the upper end of the portion 51 recesses are provided in opposite sides of the mandrel to provide flats 54 substantially parallel to spaced apart a distance substantially equal to the distance between the forks 35 of the hook 30. Of course these flats provide opposite shoulders 53, which when the hook is in place as indicated in the drawings, will rest on the tops of the forks with the result that movement upwardly of the hook will cause upward movement of the mandrel. A metallic ring 55 forms the remaining part of the mechanism essential to the operation of the device.

The operation and use of the mechanism before described is substantially as follows: A tube 60 of Celluloid is first processed to cause it to have a portion 61 of reduced diameter. This processing can be carried out in any suitable fashion, such as by swedging or in any other manner desired. A mandrel 50 is then inserted in the tube with the neck portion 51 thereof entering the reduced portion 61 of the tube. When the tube has thus properly been positioned on the mandrel the neck of the mandrel is passed through the opening in the die 23. This die, being heated, transmits some heat to the small end portion 61 of the tube. When the upper end of the tube extends beyond the top of the die, the ring 55 is slipped over the upper end of the tube. This ring has a central opening which is of such size that it will normally slip over the small end of the tube. It may slip downwardly on this small end of the tube until it contacts with the bend between the portions 60 and 61 of the tube, or, if the small end of the tube under the action of the heat of the die begins to expand, the ring may become lodged on the tube at any intermediate position between the bend before mentioned and the top of the tube.

With the mandrel and tube extending through the die and with the ring 55 in position, the hook 30 is attached to the mandrel by fitting the claws 35 into the space formed by the flats 54. The claws 35 are then hooked onto two links of the moving chain 20. As the chain moves in the direction indicated by arrows in Fig. 1, the hook naturally is carried therewith, and due to its attachment to the mandrel, the mandrel is also moved upwardly. The pin 37 as before mentioned fits under the tops 46 of the Z bars forming a channel or guideway.

As the mandrel moves upwardly the large portion 60 of the Celluloid tube will eventually reach the shoulder 24 at the lower end of the opening in the die 23. If the ring 55 has slipped down to the bend in the Celluloid tube, the mandrel will be drawn through the die and the Celluloid tube naturally must follow it. However, if the ring 55 has become lodged on the Celluloid tube at an intermediate position, the mandrel may slide upwardly in the tube with the large portion 50 thereof expanding the heated tube until the wall of the tube is engaged between the shoulder 52 of the mandrel and the bottom of the ring 55.

Since the tube 60 is initially of slightly larger diameter than the diameter of the die opening, the result follows that the tube is pressed tightly against the mandrel, forcing any entrapped air downwardly toward the bottom of the mandrel and the tube. The relative diameters of the tube and the die opening can be predetermined so that in order for the tube to pass through the die opening it becomes necessary for the tube to be reduced a slight amount in external diameter. In practice it has been found that the absence of air between the tube and the mandrel causes any stretching of the tube to occur just at the point of initial contact between the tube and the wall of the die opening. In other words, once the tube has entered the die opening, stretching no longer takes place and the tube passes through the die opening with a resultant smoothed surface due to the heat imparted thereto and the ironing action of the wall of the die opening on the surface of the tube. It is believed that the tube grips the mandrel, after the air has been expelled, with a force sufficiently great to more than counter-balance the tendency of the part in contact with the mandrel to stretch. Thus all stretching of the tube occurs approximately at the point of initial contact between the tube and the die as before stated.

The passage of the tube and mandrel through the die with a reduction of external diameter of the tube results in compressing the tube a considerable amount, and since the tube must stretch, it follows that the tube is elongated an appreciable amount. Since the hook is guided in its upward movement there is no tendency for the mandrel to move out of axial alignment with the die opening so that the tube wall, if initially of uniform thickness, will in the finished article remain of initial thickness though probably of slightly less thickness than its original state.

As before mentioned the chain 20 in its movement in the direction indicated by arrows pulls the mandrel and the tube through the die. When the hook approaches the upper sprocket wheel 19 it passes beyond the top ends of the Z bars. As the upper sprocket wheel 19 has teeth which enter the space between succeeding lengths in the chain, it follows that the upper claw 35 of the hook will contact with one of the teeth of the sprocket wheel. The tooth naturally will push the claw from engagement with the chain link, tilting the hook about its lower end as a fulcrum, thereby disengaging the prongs 35 of the hook from the mandrel. A complete disengagement of the hook from the chain is accomplished when the second claw 36 meets a succeeding tooth on the sprocket wheel. When the hook has been disengaged from the mandrel, the mandrel and tube will have passed through the die and the mandrel can be handled by the operator. The hook due to its excessive weight over the counter-balance 42 will then descend by gravity into position to engage the next mandrel. The mandrel can be forced from the tube and the smaller portion of the tube, which is of no use, can be severed from the remainder of the tube. The operation can be repeated with another mandrel having a tube thereon.

As before stated the passage of the tube through the heated die causes the tube to acquire a smooth exterior surface without changing the uniformity of wall thickness of the tube as occurs with mechanisms of the centerless grinder type, and other mechanisms heretofore used for polishing tubes.

While the invention has been described herein in connection particularly with extruded Celluloid tubes, it will be apparent that the same steps of processing and the same apparatus can be utilized with tubes made in other fashions than extrusion. Moreover, while the mandrel and the die opening have been shown to be of circular cross-section it will be apparent that other configurations, such as squares, triangles, hexagons, etc., may be employed without departing from the spirit of the invention. The word "tube" therefore is to be construed as not limited to a hollow article of circular cross-section. It will be apparent also that various modifications may be practiced in the invention without departing from the scope thereof, in view of which any limitations imposed upon the invention are to be only those set forth in the following claims.

I claim:

1. In apparatus of the character described, the combination of a die having a walled aperture therein, means for heating the wall of said aperture, a mandrel having portions of different cross-sectional dimensions to fit in a tube of thermoplastic cellulosic material of corresponding shape, means for locking the smaller portion of the tube to the smaller portion of the mandrel comprising a ring fitting around said smaller portion of the tube and adapted to engage the tube when the tube expands due to heat from said die, and means for drawing said mandrel with the tube thereon through said walled aperture of the die.

2. In apparatus of the character described, the combination of a die having a walled aperture therein, means for heating the wall of said aperture, a mandrel fitting in a tube of thermoplastic cellulosic material, means for locking said tube on said mandrel, and means for drawing said mandrel with the tube thereon through said die comprising a power driven device and a hook engaging said device and said mandrel.

3. In apparatus of the character described, the combination of a die having a walled aperture therein, means for heating the wall of said aperture, a mandrel fitting in a tube of thermoplastic cellulosic material, means for locking said tube on said mandrel, and means for drawing said mandrel with the tube thereon through said die comprising an endless power driven chain and a hook engaging said mandrel and said chain.

4. In apparatus of the character described, the combination of a die having a walled aperture therein, means for heating the wall of said aperture, a mandrel fitting in a tube of thermoplastic cellulosic material, means for locking said tube on said mandrel, and means for drawing said mandrel with the tube thereon through said die comprising an endless power driven chain and a hook engaging said mandrel and having spaced claws for engagement with links of said chain.

5. In apparatus of the character described, the combination of a die having a walled aperture therein, means for heating the wall of said aperture, a mandrel fitting in a tube of thermoplastic cellulosic material, means for locking said tube on said mandrel, and means for drawing said mandrel with the tube thereon through said die comprising an endless power driven chain, an inclined support for one expanse of said chain to prevent sagging of said expanse, and a hook engaging said mandrel, said hook having claws for engagement with links with said chain.

6. In apparatus of the character described, the combination of a die having a walled aperture therein, means for heating the wall of said aperture, a mandrel fitting in a tube of thermoplastic cellulosic material, means for locking said tube on said mandrel, and means for drawing said mandrel with the tube thereon through said die comprising an endless power driven chain, an inclined support for one expanse of said chain to prevent sagging of said expanse, a guide channel on said support, and a hook engaging said mandrel, said hook having claws for engagement with links of said chain and having a member sliding under part of said channel to prevent movement of the hook away from said support.

7. In apparatus of the character described, the combination of a die having a walled aperture therein, means for heating the wall of said aperture, a mandrel fitting in a tube of thermoplastic cellulosic material, means for locking said tube to said mandrel, said mandrel having near one end thereof oppositely disposed recesses providing shoulders spaced from the end of the mandrel, an endless power driven chain, a hook having forks fitting in said recesses and under said shoulders, said hook having claws for engagement with links of said chain whereby said hook is moved by said chain to draw said mandrel with the tube thereon through said die.

8. In apparatus of the character described, the combination of a die having a walled aperture therein, means for heating the wall of said aperture, a mandrel fitting in a tube of thermoplastic cellulosic material, means for locking said tube on said mandrel, upper and lower sprocket wheels, an endless chain passing through said sprocket wheels, a hook engaging said mandrel, said hook having claws engaging links of said chain whereby contact of said chain draws said mandrel through said die, the teeth of one of said sprocket wheels engaging said claws at the end of the path of travel of said hook to simultaneously disengage said hook from said chain and from said mandrel.

9. A continuous process for the shaping of a tube of thermoplastic cellulosic material by drawing it through a heated die, comprising seating a thermoplastic tube on a mandrel, then progressively heating said tube to soften it as it is being drawn by applying heat over a small section only of the tube immediately before said section enters the die, and drawing the tube through the die to simultaneously and continuously size and shape the interior of the tube to the size and shape of the mandrel, and the exterior of the tube to the size and shape of the die.

JOHN N. WHITEHOUSE.